(12) United States Patent
Kisel

(10) Patent No.: US 8,904,400 B2
(45) Date of Patent: Dec. 2, 2014

(54) PROCESSING SYSTEM HAVING A PARTITIONING COMPONENT FOR RESOURCE PARTITIONING

(75) Inventor: Michael Kisel, Sittsville (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 1129 days.

(21) Appl. No.: 12/025,480

(22) Filed: Feb. 4, 2008

(65) Prior Publication Data

US 2009/0070769 A1    Mar. 12, 2009

Related U.S. Application Data

(60) Provisional application No. 60/971,452, filed on Sep. 11, 2007.

(51) Int. Cl.
*G06F 9/46* (2006.01)
*G06F 9/50* (2006.01)

(52) U.S. Cl.
CPC ............ *G06F 9/5016* (2013.01); *G06F 9/5061* (2013.01); *G06F 9/5011* (2013.01); *Y02B 60/142* (2013.01)
USPC ........................................................ 718/104

(58) Field of Classification Search
None
See application file for complete search history.

(56) References Cited

U.S. PATENT DOCUMENTS

| | | | |
|---|---|---|---|
| 4,238,746 A | 12/1980 | McCool et al. |
| 4,282,405 A | 8/1981 | Taguchi |
| 4,468,804 A | 8/1984 | Kates et al. |
| 4,486,900 A | 12/1984 | Cox et al. |
| 4,531,228 A | 7/1985 | Noso et al. |
| 4,628,156 A | 12/1986 | Irvin |
| 4,630,305 A | 12/1986 | Borth et al. |
| 4,731,846 A | 3/1988 | Secrest et al. |
| 4,791,390 A | 12/1988 | Harris et al. |
| 4,811,404 A | 3/1989 | Vilmur et al. |
| 4,843,562 A | 6/1989 | Kenyon et al. |
| 4,939,685 A | 7/1990 | Feintuch |
| 4,969,192 A | 11/1990 | Chen et al. |
| 5,027,410 A | 6/1991 | Williamson et al. |
| 5,056,150 A | 10/1991 | Yu et al. |
| 5,146,539 A | 9/1992 | Doddington et al. |

(Continued)

FOREIGN PATENT DOCUMENTS

| CA | 2158847 | 9/1994 |
|---|---|---|
| CA | 2157496 | 10/1994 |

(Continued)

OTHER PUBLICATIONS

Anderson C.M., et al: "Adaptive Enhancement of Finite Bandwidth Signals in White Gaussian Noise," *IEEE Trans. on Acoustics, Speech and Signal Processing*, vol. ASSP-31, No. 1, Feb. 1983, pp. 17-28.

(Continued)

*Primary Examiner* — Gregory A Kessler
(74) *Attorney, Agent, or Firm* — Brinks Gilson & Lione

(57) ABSTRACT

A processing system includes a resource that is accessible by a processor and resource partitioning software executable by the processor. The resource partitioning software may be executed to establish a resource partition for the resource. The resource partition defines a set of rules that are used to control access to the resource when a request for the resource is received from a software application and/or process.

27 Claims, 10 Drawing Sheets

(56) References Cited

U.S. PATENT DOCUMENTS

| | | | |
|---|---|---|---|
| 5,278,780 A | 1/1994 | Eguchi et al. | |
| 5,313,555 A | 5/1994 | Kamiya | |
| 5,377,276 A | 12/1994 | Terai et al. | |
| 5,400,409 A | 3/1995 | Linhard | |
| 5,406,622 A | 4/1995 | Silverberg et al. | |
| 5,408,581 A | 4/1995 | Suzuki et al. | |
| 5,412,735 A | 5/1995 | Engebretson et al. | |
| 5,432,859 A | 7/1995 | Yang et al. | |
| 5,459,813 A | 10/1995 | Klayman | |
| 5,473,702 A | 12/1995 | Yoshida et al. | |
| 5,479,517 A | 12/1995 | Linhard | |
| 5,494,886 A | 2/1996 | Kehne et al. | |
| 5,495,415 A | 2/1996 | Ribbens et al. | |
| 5,502,688 A | 3/1996 | Recchione et al. | |
| 5,526,466 A | 6/1996 | Takizawa | |
| 5,530,768 A | 6/1996 | Yoshizumi | |
| 5,568,559 A | 10/1996 | Makino | |
| 5,572,262 A | 11/1996 | Ghosh | |
| 5,584,295 A | 12/1996 | Muller et al. | |
| 5,590,241 A | 12/1996 | Park et al. | |
| 5,615,298 A | 3/1997 | Chen | |
| 5,617,508 A | 4/1997 | Reaves | |
| 5,641,931 A | 6/1997 | Ogai et al. | |
| 5,652,832 A * | 7/1997 | Kane et al. | 714/2 |
| 5,677,987 A | 10/1997 | Seki et al. | |
| 5,680,508 A | 10/1997 | Liu | |
| 5,692,104 A | 11/1997 | Chow et al. | |
| 5,701,344 A | 12/1997 | Wakui | |
| 5,714,997 A | 2/1998 | Anderson | |
| 5,737,719 A | 4/1998 | Terry | |
| 5,742,694 A | 4/1998 | Eatwell | |
| 5,812,844 A * | 9/1998 | Jones et al. | 718/104 |
| 5,819,215 A | 10/1998 | Dobson et al. | |
| 5,845,243 A | 12/1998 | Smart et al. | |
| 5,920,840 A | 7/1999 | Satyamurti et al. | |
| 5,920,848 A | 7/1999 | Schutzer et al. | |
| 5,933,801 A | 8/1999 | Fink et al. | |
| 5,949,886 A | 9/1999 | Nevins et al. | |
| 5,949,888 A | 9/1999 | Gupta et al. | |
| 5,953,694 A | 9/1999 | Pillekamp | |
| 5,974,567 A | 10/1999 | Dickson, Jr. et al. | |
| 6,011,853 A | 1/2000 | Koski et al. | |
| 6,084,907 A | 7/2000 | Nagano et al. | |
| 6,111,957 A | 8/2000 | Thomasson | |
| 6,144,336 A | 11/2000 | Preston et al. | |
| 6,163,608 A | 12/2000 | Romesburg et al. | |
| 6,167,375 A | 12/2000 | Miseki et al. | |
| 6,173,074 B1 | 1/2001 | Russo | |
| 6,175,602 B1 | 1/2001 | Gustafson et al. | |
| 6,192,134 B1 | 2/2001 | White et al. | |
| 6,199,035 B1 | 3/2001 | Lakaniemi et al. | |
| 6,219,418 B1 | 4/2001 | Eriksson et al. | |
| 6,249,275 B1 | 6/2001 | Kodama | |
| 6,282,430 B1 | 8/2001 | Young | |
| 6,285,979 B1 | 9/2001 | Ginzburg et al. | |
| 6,405,168 B1 | 6/2002 | Bayya et al. | |
| 6,408,273 B1 | 6/2002 | Quagliaro et al. | |
| 6,434,246 B1 | 8/2002 | Kates et al. | |
| 6,473,409 B1 | 10/2002 | Malvar | |
| 6,493,338 B1 | 12/2002 | Preston et al. | |
| 6,507,814 B1 | 1/2003 | Gao | |
| 6,587,816 B1 | 7/2003 | Chazen et al. | |
| 6,628,781 B1 | 9/2003 | Grundström et al. | |
| 6,633,894 B1 | 10/2003 | Cole | |
| 6,643,619 B1 | 11/2003 | Linhard et al. | |
| 6,687,669 B1 | 2/2004 | Schrögmeier et al. | |
| 6,690,681 B1 | 2/2004 | Preston et al. | |
| 6,694,419 B1 | 2/2004 | Schnee et al. | |
| 6,725,190 B1 | 4/2004 | Chazan et al. | |
| 6,732,073 B1 | 5/2004 | Kluender et al. | |
| 6,771,629 B1 | 8/2004 | Preston et al. | |
| 6,782,363 B2 | 8/2004 | Lee et al. | |
| 6,804,640 B1 | 10/2004 | Weintraub et al. | |
| 6,822,507 B2 | 11/2004 | Buchele | |
| 6,836,761 B1 | 12/2004 | Kawashima et al. | |
| 6,859,420 B1 | 2/2005 | Coney et al. | |
| 6,871,176 B2 | 3/2005 | Choi et al. | |
| 6,885,752 B1 | 4/2005 | Chabries et al. | |
| 6,891,809 B1 | 5/2005 | Ciccone et al. | |
| 6,898,293 B2 | 5/2005 | Kaulberg | |
| 6,910,011 B1 | 6/2005 | Zakarauskas | |
| 6,937,978 B2 | 8/2005 | Liu | |
| 7,020,291 B2 | 3/2006 | Buck et al. | |
| 7,117,149 B1 | 10/2006 | Zakarauskas | |
| 7,146,012 B1 | 12/2006 | Belt et al. | |
| 7,146,316 B2 | 12/2006 | Alves | |
| 7,167,516 B1 | 1/2007 | He | |
| 7,167,568 B2 | 1/2007 | Malvar et al. | |
| 7,206,418 B2 | 4/2007 | Yang et al. | |
| 7,222,345 B2 * | 5/2007 | Gray et al. | 718/104 |
| 7,231,347 B2 | 6/2007 | Zakarauskas | |
| 7,269,188 B2 | 9/2007 | Smith | |
| 7,272,566 B2 | 9/2007 | Vinton | |
| 7,346,569 B2 * | 3/2008 | Oberuc | 705/36 R |
| 7,406,522 B2 * | 7/2008 | Riddle | 709/226 |
| 7,647,346 B2 | 1/2010 | Silverman et al. | |
| 7,721,292 B2 * | 5/2010 | Frasier et al. | 718/104 |
| 7,783,686 B2 | 8/2010 | Gates et al. | |
| 2001/0005822 A1 | 6/2001 | Fujii et al. | |
| 2001/0028713 A1 | 10/2001 | Walker | |
| 2002/0007381 A1 | 1/2002 | Bruckner | |
| 2002/0052736 A1 | 5/2002 | Kim et al. | |
| 2002/0071573 A1 | 6/2002 | Finn | |
| 2002/0176589 A1 | 11/2002 | Buck et al. | |
| 2002/0194251 A1 * | 12/2002 | Richter et al. | 709/105 |
| 2003/0040908 A1 | 2/2003 | Yang et al. | |
| 2003/0093265 A1 | 5/2003 | Xu et al. | |
| 2003/0093270 A1 | 5/2003 | Domer | |
| 2003/0097257 A1 | 5/2003 | Amada et al. | |
| 2003/0101048 A1 | 5/2003 | Liu | |
| 2003/0206640 A1 | 11/2003 | Malvar et al. | |
| 2003/0216907 A1 | 11/2003 | Thomas | |
| 2004/0002856 A1 | 1/2004 | Bhaskar et al. | |
| 2004/0024600 A1 | 2/2004 | Hamza et al. | |
| 2004/0071284 A1 | 4/2004 | Abutalebi et al. | |
| 2004/0078200 A1 | 4/2004 | Alves | |
| 2004/0138882 A1 | 7/2004 | Miyazawa | |
| 2004/0165736 A1 | 8/2004 | Hetherington et al. | |
| 2004/0167777 A1 | 8/2004 | Hetherington et al. | |
| 2004/0179610 A1 | 9/2004 | Lu et al. | |
| 2005/0075866 A1 | 4/2005 | Widrow | |
| 2005/0097296 A1 | 5/2005 | Chamberlain et al. | |
| 2005/0111683 A1 | 5/2005 | Chabries et al. | |
| 2005/0114128 A1 | 5/2005 | Hetherington et al. | |
| 2005/0240401 A1 | 10/2005 | Ebenezer | |
| 2006/0026598 A1 * | 2/2006 | Handlogten et al. | 718/104 |
| 2006/0031672 A1 * | 2/2006 | Soltis et al. | 713/164 |
| 2006/0034447 A1 | 2/2006 | Alves et al. | |
| 2006/0056502 A1 | 3/2006 | Callicotte | |
| 2006/0074646 A1 | 4/2006 | Alves et al. | |
| 2006/0089958 A1 | 4/2006 | Giesbrecht et al. | |
| 2006/0089959 A1 | 4/2006 | Nongpiur et al. | |
| 2006/0100868 A1 | 5/2006 | Hetherington et al. | |
| 2006/0115095 A1 | 6/2006 | Giesbrecht et al. | |
| 2006/0116873 A1 | 6/2006 | Hetherington et al. | |
| 2006/0178972 A1 * | 8/2006 | Jung et al. | 705/35 |
| 2006/0251268 A1 | 11/2006 | Hetherington et al. | |
| 2006/0287859 A1 | 12/2006 | Hetherington et al. | |
| 2007/0033031 A1 | 2/2007 | Zakarauskas | |
| 2007/0136055 A1 | 6/2007 | Hetherington | |
| 2007/0162909 A1 * | 7/2007 | Bahl et al. | 718/104 |
| 2007/0245116 A1 | 10/2007 | Yamamoto et al. | |
| 2008/0059971 A1 * | 3/2008 | Abbey et al. | 718/104 |

FOREIGN PATENT DOCUMENTS

| | | |
|---|---|---|
| CA | 2158064 | 10/1994 |
| EP | 0 076 687 A1 | 4/1983 |
| EP | 0 275 416 | 7/1988 |
| EP | 0 558 312 A1 | 9/1993 |
| EP | 0 629 996 A2 | 12/1994 |
| EP | 0 629 996 A3 | 12/1994 |
| EP | 0 750 291 A1 | 12/1996 |
| EP | 0 948 237 A2 | 10/1999 |

(56) References Cited

FOREIGN PATENT DOCUMENTS

| EP | 1 450 353 A1 | 8/2004 |
|---|---|---|
| EP | 1 450 354 A1 | 8/2004 |
| EP | 1 669 983 A1 | 6/2006 |
| JP | 06269084 A2 | 9/1994 |
| JP | 06319193 A | 11/1994 |
| WO | WO 0041169 A1 | 7/2000 |
| WO | WO 0156255 A1 | 8/2001 |
| WO | WO 0173761 A1 | 10/2001 |
| WO | WO 2006/130668 | 12/2006 |

OTHER PUBLICATIONS

Avendano, C. et al., "Study on the Dereverberation of Speech Based on Temporal Envelope Filtering," Proc. ICSLP '96, Oct. 1996, pp. 889-892.

Berk et al., "Data Analysis with Microsoft Excel," Duxbury Press, 1998, pp. 236-239 and 256-259.

Bilcu, R.C. et al., "A New Variable Length LMS Algorithm: Theoretical Analysis and Implementations," 2002, IEEE, pp. 1031-1034.

Byun K.J., et al: "Noise Whitening-Based Pitch Detection for Speech Highly Corrupted by Colored Noise," *ETRI Journal*, vol. 25, No. 1, Feb. 2003, pp. 49-51.

Campbell D.A., et al: "Dynamic Weight Leakage for LMS Adaptive Linear Predictors," *Tencon '96 Proceedings*, 1996 IEEE Tencon Digital Signal Processing Applications Perth, WA, Australia Nov. 26-29, 1996, NY, NY, USA, IEEE, US, vol. 2, Nov. 26, 1996, pp. 574-579.

Chang J.H., et al: "Pitch Estimation of Speech Signal Based on Adaptive Lattice Notch Filter," *Signal Processing*, Elsevier Science Publishers B.V. Amsterdam, NL, vol. 85, No. 3, Mar. 2005, pp. 637-641.

Fiori, S. et al., "Blind Deconvolution by Modified Bussgang Algorithm," Dept. of Electronics and Automatics—University of Ancona (Italy), ISCAS 1999, 4 pages.

Kang, Hae-Dong; "Voice Enhancement Using a Single Input Adaptive Noise Elimination Technique Having a Recursive Time-Delay Estimator," Kyungbook National University (Korea), Doctoral Thesis, Dec. 31, 1993, pp. 11-26.

Kauppinen, I., "Methods for Detecting Impulsive Noise in Speech and Audio Signals," 2002, IEEE, pp. 967-970.

Koike, S., "Adaptive Threshold Nonlinear Algorithm for Adaptive Filters with Robustness Against Impulse Noise," 1996, IEEE, NEC Corporation, Tokyo 108-01, pp. 1644-1647.

Learned, R.E. et al., A Wavelet Packet Approach to Transient Signal Classification, Applied and Computational Harmonic Analysis, 1995, pp. 265-278.

Nakatani, T., Miyoshi, M., and Kinoshita, K., "Implementation and Effects of Single Channel Dereverberation Based on the Harmonic Structure of Speech," Proc. of IWAENC-2003, Sep. 2003, pp. 91-94.

Nascimento, V.H., "Improving the Initial Convergence of Adaptive Filters: Variable-Length LMS Algorithms," 2002 IEEE, pp. 667-670.

Pornimitkul, P. et al., 2102797 Statistic Digital Signal Processing, Comparison of NLMS and RLS for Acoustic Echo Cancellation (AEC) and White Gaussian Noise (WGN), Department of Electrical Engineering Faculty of Engineering, Chulalongkorn University, 2002, pp. 1-19.

Puder, H. et al., "Improved Noise Reduction for Hands-Free Car Phones Utilizing Information on a Vehicle and Engine Speeds," Signal Theory, Darmstadt University of Technology, 2000, pp. 1851-1854.

Quatieri, T.F. et al., "Noise Reduction Using a Soft-Decision Sine-Wave Vector Quantizer," International Conference on Acoustics, Speech & Signal Processing, 1990, pp. 821-824.

Quelavoine, R. et al., "Transients Recognition in Underwater Acoustic with Multilayer Neural Networks," Engineering Benefits from Neural Networks, Proceedings of the International Conference EANN 1998, Gibraltar, Jun. 10-12, 1998 pp. 330-333.

Rabiner L.R., et al: "A Comparative Performance Study of Several Pitch Detection Algorithms," *IEEE Trans. on Acoustics, Speech and Signal Processing*, vol. ASSP-24, No. 5, Oct. 1976, pp. 399-418.

Sasaoka N, et al: "A New Noise Reduction System Based on ALE and Noise Reconstruction Filter," *Circuits and Systems*, 2005. ISCAS 2005. IEEE International Symposium on Kobe, Japan May 23-26, 2005, Piscataway, NJ USA, IEEE May 23, 2005, pp. 272-275.

Seely, S., "An Introduction to Engineering Systems," Pergamon Press Inc., 1972, pp. 7-10.

Shust, M.R. et al., "Electronic Removal of Outdoor Microphone Wind Noise," obtained from the Internet on Oct. 5, 2006 at: <http://www.acoustics.org/press/136th/mshust.htm>, 6 pages.

Shust, M.R., Abstract of "Active Removal of Wind Noise From Outdoor Microphones Using Local Velocity Measurements," *J. Acoust. Soc. Am.*, vol. 104, No. 3, Pt 2, 1998, 1 page.

Simon, G., "Detection of Harmonic Burst Signals," International Journal Circuit Theory and Applications, Jul. 1985, vol. 13, No. 3, pp. 195-201.

Tam, K. et al., "Highly Oversampled Subband Adaptive Filters for Noise Cancellation on a Low-resource DSP System," Proc. of Int. Conf. on Spoken Language Processing (ICSLP), Sep. 2002, pp. 1-4.

Vaseghi, S. et al., "The Effects of Non-Stationary Signal Characteristics on the Performance of Adaptive Audio Restoration System," 1989, IEEE, pp. 377-380.

Vieira, J., "Automatic Estimation of Reverberation Time," Audio Engineering Society, Convention Paper 6107, 116th Convention, May 8-11, 2004, Berlin, Germany, pp. 1-7.

Wahab A. et al., "Intelligent Dashboard With Speech Enhancement," Information, Communications, and Signal Processing, 1997. ICICS, Proceedings of 1997 International Conference on Singapore, Sep. 9-12, 1997, New York, NY, USA, IEEE, pp. 993-997.

Widrow, B. et al., "Adaptive Noise Cancelling: Principles and Applications," 1975, IEEE, vol. 63, No. 13, New York, pp. 1692-1716.

Zakarauskas, P., "Detection and Localization of Nondeterministic Transients in Time series and Application to Ice-Cracking Sound," Digital Signal Processing, 1993, vol. 3, No. 1, pp. 36-45.

\* cited by examiner

PROCESSING SYSTEM HAVING A PARTITIONING COMPONENT FOR RESOURCE PARTITIONING

PRIORITY CLAIM

This application claims the benefit of priority from U.S. Provisional Application No. 60/971,452, filed Sep. 11, 2007, which is incorporated by reference.

BACKGROUND OF THE INVENTION

1. Technical Field

This invention relates generally to the field of computer resource management, and in particular, to a system that manages resources in a processing system.

2. Related Art

Computers, embedded controllers, and other processing systems may include a number of finite resources. Such resources may include communication bandwidth resources, interrupt handling resources, mutexes, semaphores and other resources. The management of such allocatable resources may have an impact on the operation and/or efficiency of the processing system.

Some resource management approaches may implement a rigid partitioning scheme. In a rigid partitioning scheme, a resource may be divided into fixed-size chunks. A finite amount of the resource may be reserved to make that finite amount unavailable to other entities in a processing system. For example, processes may reserve portions of memory that they never use, at the same time causing a lack of free memory that blocks or delays other processes. A process may reserve access to all or a portion of an I/O device and thereby block access of the I/O device to other processes.

Other resource management techniques are clumsy and inefficient, solely reserving resources on a first-come, first-served basis without any regard for the effective operation of the processing system. Therefore, there is a need for an alternative system for managing system resources.

SUMMARY

A processing system includes a resource that is accessible by a processor and resource partitioning software executable by the processor. The resource partitioning software may be executed to establish a resource partition for the resource. The resource partition defines a set of rules that are used to control access to the resource when a request for the resource is received from a software application and/or process.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
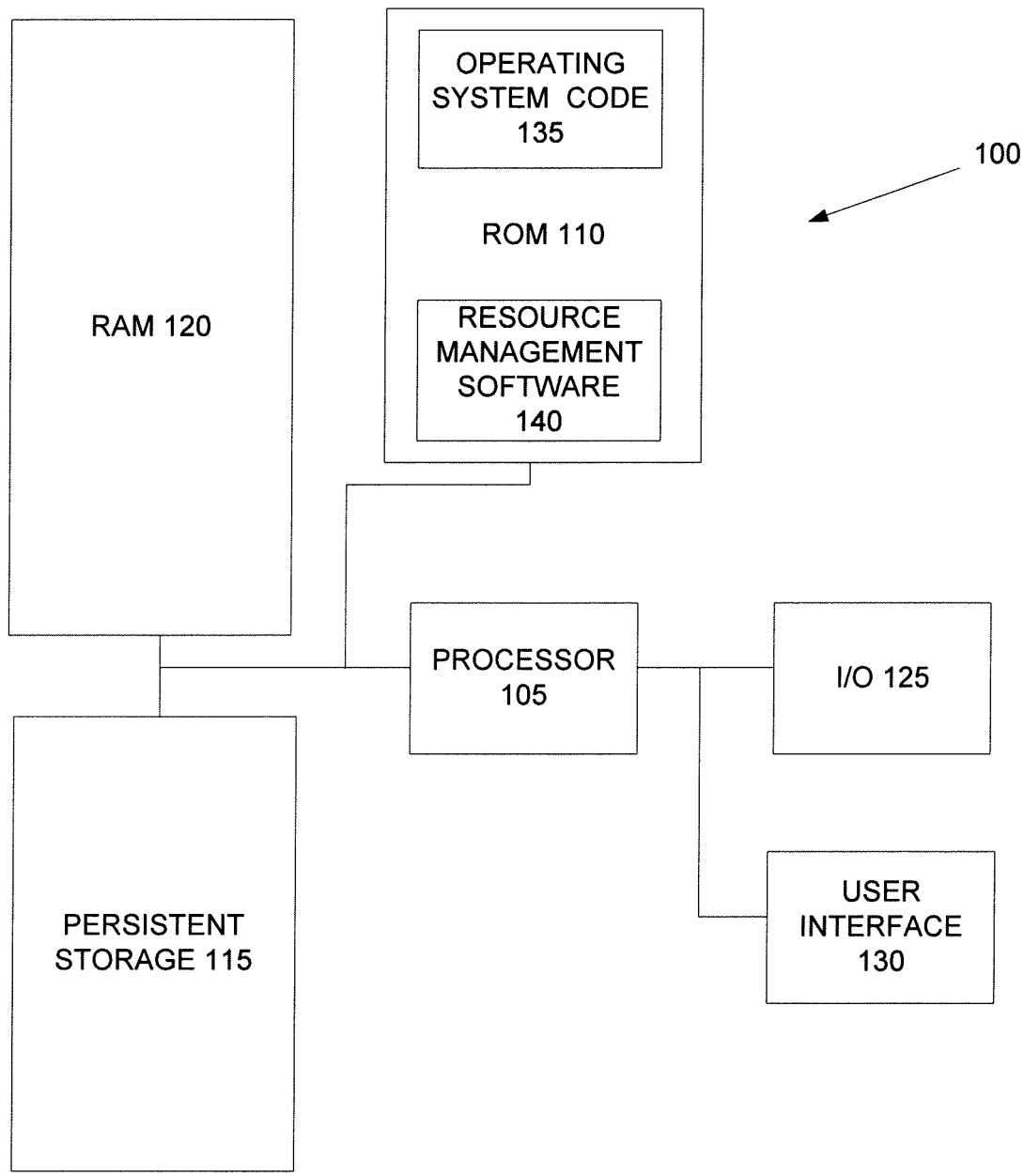
FIG. 1 is a diagram of a processing system.

FIG. 1 is a block diagram of a processing system 100. The processing system 100 includes a processor 105, a memory such as read only memory (ROM) 110, and a persistent storage unit 115. Processing system 100 also may include random access memory (RAM) 120, an I/O (input/output) interface 125, and a user interface 130.

Read only memory (ROM) 110 may retain operating system code 135 that controls the interaction between high-level application programs executed by the processor 105 and hardware components, including memory devices 110 and 120, the persistent storage unit 115, and the interface devices 125 and 130. The operating system code 135 may include resource management software 140 for organizing and controlling access to the various allocatable computer resources, which may include, for example: internal and external memory, external communication bandwidth, interrupt handling, direct memory access (DMA), mutexes, semaphores, interface cards and hardware subsystems. Alternatively, the resource management software 140 may be stored in a separate medium remote from operating system code 135. In some systems, the resource management software may be stored in read only memory 110, persistent storage unit 115, or in some other storage medium. When the processing system 100 is linked with other computers and/or storage devices through I/O interface 125, the resource management software may be stored remotely and downloaded to processing system 100 as needed. FIG. 1 illustrates storage of the resource management software 140 in read only memory 110.

The persistent storage unit 115 may comprise a hard disc drive, floppy disk drive, etc. It may be a non-rotating media device, such as non-volatile memory implemented in an integrated circuit format (i.e. FLASH memory, etc.). The persistent storage unit 115 need not be limited to a single memory structure. Rather, the persistent storage unit 115 may include a number of separate storage devices of the same type (e.g., all FLASH memory) and/or separate storage devices of different types (e.g., one or more FLASH memory units and one or more hard disk drives).

Figure 2:
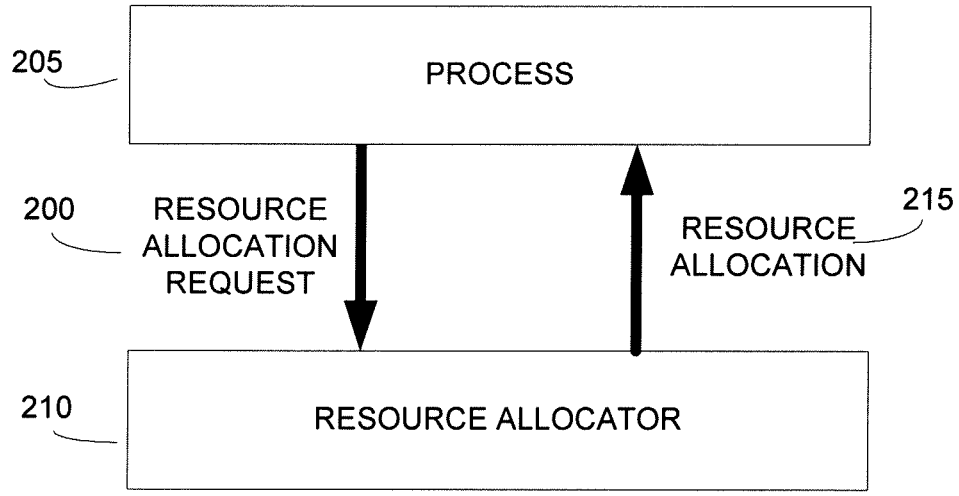
FIG. 2 is a diagram showing communication between a process and a resource allocator.

The block diagram of FIG. 2 shows an arrangement of a processing system having resource management. Requests for a resource 200 may be issued by a software application or process 205 and passed to a resource allocator 210. The resource allocator 210 coordinates access to the requested resource. The resource allocator 210 may vary depending on the nature of the resource being allocated.

The resource allocator 210 may respond to the request by reserving the requested resource. It may also return corresponding confirmations, mappings and/or resource allocation data 215 back to the software application or process 205.

The resource allocator 210 may also perform other tasks. When the requested resource is system memory, the resource allocator 210 may coordinate memory requirements to match available blocks, assign memory that is best suited to a particular application, and similar memory allocation operations.

Figure 3:
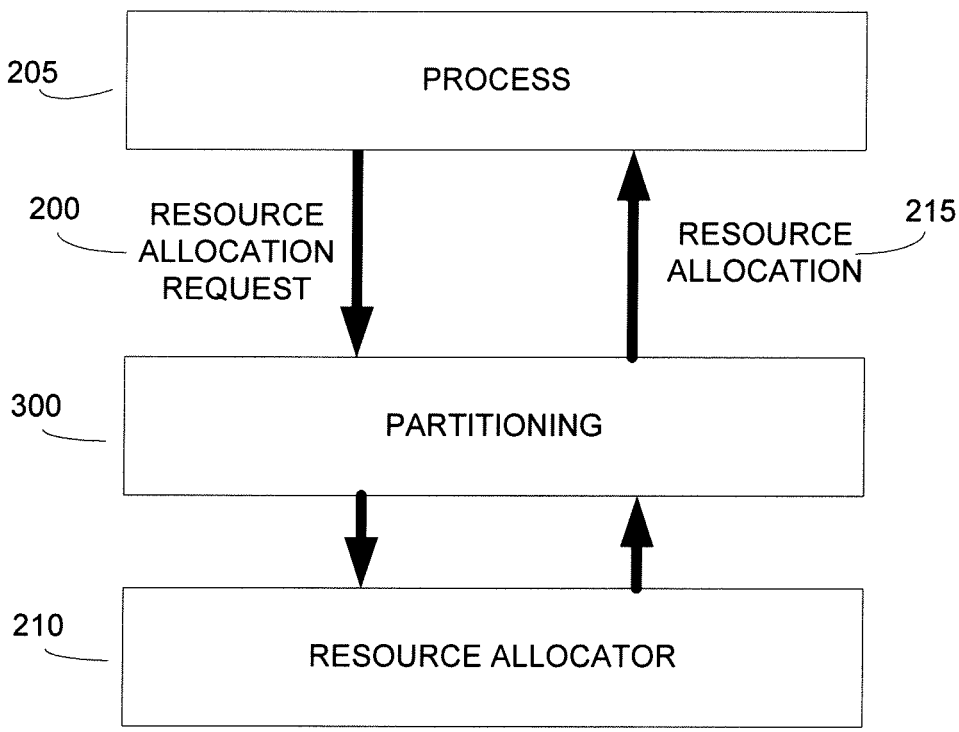
FIG. 3 is a diagram showing communication between a process and a resource allocator through a resource partitioner.

FIG. 3 is a block diagram of the components that may be used to implement a processing system having partitioned resource allocation management. The system shown in FIG. 3 includes a partitioning module 300 between the software application or process 205 and the resource allocator 210. The partitioning module 300 may intercept one or more resource requests 200 issued by the software application or process 205. The partitioning module 215 may manipulate one or more of the resource requests 200 and provide new and/or modified requests to the resource allocator 210. The partitioning module 300 may also validate and/or deny requests, thereby enforcing rules that may be associated with a partition. The partitioning module 300 may also arbitrate communications between the resource allocator 210 and the software application or process 205. For example, the partitioning module 300 may intercept and/or manipulate and/or validate the communication of confirmations, mappings and/or resource allocation data 215 returned to the software application or process 205.

The partitioning module 300 may define and manage new partitions and classes with respect to requests for resources. For example, the partitioning module 300 may set the minimum and maximum values for relevant resource constraints and/or parameters for those partitions as well as other properties for those partitions.

When a process creates objects, the class of resource that one object requires may be different than that for another object the process creates. The concept of resource classes is supported by the resource partitioning design such that different classes of resources (i.e. resources with different attributes) can be independently partitioned. If a particular process requires a particular class of resource, that process can be associated with a partition of that class, independent of the resource class requirements of any other process.

This system allows customers to establish classes that distinguish between the different levels of importance or costs of different kinds of resources. For example, memory compatible with DMA may be distinguished from memory that is not compatible with DMA. DMA-capable memory may be used for general purposes but it may not be desirable to allocate all the DMA-compatible memory for general use. If not differentiated, DMA-capable memory may not be available to satisfy a request that requires only DMA-capable memory. By partitioning different resource classes separately, and by allowing one process to be associated with more than one partition, software resource requirements for both DMA and non-DMA memory (or whatever resource-classes are being managed) may be protected.

When partitioning resources, each resource class may be partitioned independently. A resource partition may represent a single class of resource. Therefore, if a process creates objects that require different classes of resources, each object may be associated with a different partition.

The partitioning module 300 may provide a mechanism to group partitions to allow a single, arbitrarily named, pseudo-partition to represent other real partitions. This capability may allow association of resource partitions of different types (or classes) using a single specified name. Furthermore, partitions of different resource classes may be associated with one another using that single specified name. This capability may alternatively be provided as a layer on top of the resource partitioning design.

Resource partitions of a given resource class may nest. Newly created resource partitions may subdivide a parent partition and form a hierarchy. Nesting may be used to constrain a newly created partition process with the attributes of one or more currently related partitions.

Resource Partition Attributes and Policies

A partition may be an entity that represents the attributes and rules which govern the use of a resource. Resource partitions may have the following configurable attributes for a given level of accessibility, portion of the resource, or other non-replenishable parameter that processes are competing for:

i. minimum size (guarantee); the minimum size attribute specifies the amount of a particular class of resource that may be reserved for exclusive use by processes which are associated with the partition; and ii. maximum size (restriction); the maximum size attribute specifies the amount of a particular class of resource that may never be exceeded for use by processes which are associated with the partition.

Some results of these attributes may include:

i. Reserved Resource

A non-zero minimum value may be used to represent a reservation and not an allocation. When a non-zero minimum value is successfully configured for a resource partition, the resource is reserved for exclusive use by that partition in the resource allocator for that resource class. It may not be pre-allocated; and Allocations made against partitions with reservations are accounted against unused reservations first and against available discretionary resource capacity second;

ii. Discretionary Resource

The difference between the maximum and minimum values for a resource partition may represent the amount of discretionary resource of that class available for the creation of objects associated with the resource partition. The value may be zero; and Access to discretionary resource capacity may be dependent upon system partition configuration and may not guarantee availability.

Discretionary capacity may be allocated as it is requested, but any other allocating model may also be used.

Resource Partition Types

A variety of attributes and rules may be used to define a resource partition. Partitioning configurations may include:

1. "Open" use case; minimum=0, maximum=no limit; discretionary only;

Resource allocations made for objects associated with this partition type may be subject to the availability of discretionary capacity of the resource. There may be no limit (beyond the limit of physical resources available to the resource allocator 210 for that class) to the amount of the resource that may be requested. Allocations made for objects associated with this resource partition may not succeed. This partition configuration may create an environment similar to the case when there is no resource partitioning. If resource capacity is available, the allocation request may succeed (notwithstanding factors unrelated to availability), otherwise it may fail.

2. "Guarantee" use case; minimum=N, maximum=no limit, reserved+discretionary;

"N" capacity of the respective resource class is reserved and available for allocation to objects associated with the resource partition. There may be no limit (beyond the limit of physical resources available to the resource allocator 210 of that class) to the amount of the resource that may be requested. This partition configuration may be used when objects associated with this resource partition will require a specific amount of the resource. Further resource requirements may be governed by the rules for discretionary resource allocations.

3. "Restricted" use case; minimum=0, maximum=N, discretionary only;

Resource allocations made for objects associated with this resource partition type are subject to the availability of discretionary capacity and, furthermore, may not exceed the limit of "N" capacity. This partition configuration may be used when it is not known what the resource requirements are for the objects associated with this resource partition. The "N" capacity limit may not be exceeded.

4. "Sandbox" use case; minimum=N, maximum=N, reserved only;

"N" capacity, and only "N" capacity of the respective resource class is reserved and available for allocation to objects associated with the resource partition.

This partition configuration may be used when it is known what the resource requirements are for the objects associated with this partition or for situations where a course subdivision of the available resource class is desired. This configuration may allocate resources for further subdivision (using any of the defined partition configurations) by other processes.

Partitions are not limited to a fixed number of types. Another configuration might combine the guarantee and restricted types. This configuration specifies a reserved capacity but allows for a "not to exceed" buffer of discretionary allocations. This configuration may be used to assist in tuning a sandbox or for accommodating transient resource allocations in a guarantee partition.

Partitions may be established either at run time or at the time a bootable image is built using appropriate run-time APIs and build-time tools. Partitions may be dynamic. An "open" partition may be dynamically changed to a "closed" one (or changed to any other partition type) when the minimum and/or maximum values are changed at run time.

Resource Classes

Resource classes may be available to the system through pre-configured system configuration information, defined at build time, and/or available after boot-time. For example, bios information on x86 systems may be used to establish resource classes. In the case of a QNX® Neutrino® operating system, the resource classes may be available at startup through a system page. The classes may be available for partitioning when they are introduced into the partitioning namespace or under whatever root path is used by the system. For example, on QNX's Neutrino operating system, partitionable resources may be exposed in the /partition/<resource> namespace.

The Namespace

Resource partitioning may use a POSIX namespace to represent the naming of partitions and their hierarchical relationships. This provides access to usage statistics, configuration options, and other features offered by the resource partitioning module.

On non-POSIX systems, resource partitions may use a portion of the system's namespace used by that system. On systems which do not have a namespace, a resource partition may create its own namespace.

Namespace access to the resource partitioning module may facilitate the following:

Access control through POSIX permissions (or on non-POSIX systems, whatever permission control is used on members of the path name space);

The ability to view and manipulate partition topology using known and understood utilities (for example, on POSIX systems, ls, mkdir, and rm); and Use of existing POSIX API's such as open( ), close( ) and ioctl( )—(or on non-POSIX systems whatever existing APIs are used on members of the path namespace).

Before a resource class may be partitioned, the resource class may be added to the system by creating a new entry in namespace using the resource class name as registered in the system page (in the case of a QNX system). In some implementations, a name may be created that is appropriate to the system. Systems that do not have a namespace may use an alternative mechanism for exposing the partitioning interface.

Since partitioning may take place on a per resource class basis, a partition may be created in the namespace under the respective resource class. A partition of the system resource class, the system partition, may be created by default. This partition may be used to account for substantially all resource allocations by the software processes. These allocations may include kernel allocations done on behalf of these processes, which have not otherwise associated with a different partition. If additional partitions are not created, allocations may be accounted to the system partition.

Resource Partition Configurations

Using the various partition types, resource partitions may be organized into various topologies or configurations that allow them to be useful. The resource partitioning module may create a root partition that does not have a parent partition. Resource partition topologies may be flat, in which all resource partitions are root partitions, and/or hierarchical, in which at least one root partition exists with one or more child partitions beneath it. In a flat topology, the attributes specified for a resource partition are not based on the attributes of any other resource partition. Resource partitions of any type may be created so long as the rules for creation are satisfied.

In a hierarchical topology, the attributes of a parent resource partition constrain the attributes of the child. The following rules may be used in a resource partition hierarchy:

The rule of subdivision is that when a partition is created as the child of an existing partition, a non-zero minimum configured in the child will be accounted as an allocation to the parent partition. If the parent partition has any unallocated reserved capacity, it may be used to satisfy some or all of the child reservation. This reservation may be accounted up the entire resource partition hierarchy until is fully accounted for in either a parent partition or some combination of parent partitions and the allocator for the resource class.

When an allocation is made for a resource in a child partition, the allocation is accounted for in the partition hierarchy. Enough "free space" must exist in the hierarchy in order for an allocation to succeed.

Partition rules may govern whether the allocation of resources are allowed to proceed. There are many other reasons unrelated to availability that might prevent the resource allocator 210 for a given class of resource from satisfying an allocation request. For example, if the resource is memory, a request for a contiguous block of physical memory may not exceed the size rules of the partition, but due to internal fragmentation, may not be able to be satisfied by the allocator for the memory class.

The rules governing the use of these attributes may be as follows:

The maximum size attribute may always be >=the minimum size attribute;

The minimum/maximum size attributes may have a range from 0 to unlimited; and

Minimum and maximum values can be modified subject to the aforementioned rules.

Pseudo Partitions or Partition Groups

A real partition is a partition of a resource class. Pseudo partitions and partition group names may be used to group real partitions for convenience. A real partition may be a partition with attributes and policies that refer to an actual resource. A group name may be a reference to a collection of real partitions. A pseudo partition may be an alias for a real partition. Group names and pseudo partitions may be used to simplify process associations by allowing association between a process and a single group name and, by extension, to a collection of real partitions through their respective pseudo partitions. Group names and pseudo partitions may also be used to link differing resource types through a common partition name.

Process Association with Resource Partitions

When a process is created, optional parameters to posix_spawn( ), or whatever process spawning primitive the operating system provides, allow the specification of resource partition(s) with which the spawned process should be associated. If nothing is specified, the default behaviour may include associating the spawned process with the same partition(s) as those of the caller. A forked process may be associated with the same partition(s) as the parent. The decision for inheritance behaviour may be specified on a per resource class basis.

By utilizing API's, processes may be able to associate themselves with partitions, (e.g., self-initiated). Similarly, a system controller application may utilize the same API's to effect associations for other processes without coordinating with those processes or without the processes being aware that such associations have been effected on their behalf.

Resource Partition Metrics

The resource partition metrics account for the available system resources and their usage. Applications may retrieve the following information:

creation configuration (attributes and policies at the time the partition was created);

current partition usage; and highest partition size.

Resource Partition Events

When an application attempts to allocate more resource capacity than is permitted by the resource partition that the process is associated with, the allocation request may fail and return the appropriate error condition to the requester. A privileged process may register to be notified for various partition events. Notification may be delivered by a message or signal to a designated thread of the registered process or by any other form or inter-process communication or thread synchronization primitive provided by the operating system. These events may include, for example:

size change events (threshold crossing and delta change);

configuration change events (including, for example, failed attempts);

process association and disassociation events (including, for example, failed attempts); and child partition creation and destruction events (including, for example, failed attempts).

Similar information may be available for the resource class as a whole.

Issues of Security

Security, or deciding what software you "trust", may be a concern when configuring a resource partition. In some instances, security issues may be the reason for the partitioning of one or more resources. The system may provide support for one or more of the following security configuration settings:

1. Configuration security:

the ability to prevent resource partition topology changes the ability to prevent illegal resource partition creation the ability to prevent partition destruction 2. Operational security:

the ability to ensure that guarantees are provided the ability to ensure that restrictions are enforced the ability to ensure that only authorized processes can be associated with partitions.

The following mechanisms may affect the security policies:

1. POSIX file permissions (or similar file permissions for non-POSIX based systems)—this mechanism provides a rudimentary level of control based on the well understood user/group/world permissions.

read permission allow metrics to be obtained;

write permission allow configuration changes to be made; and execute permissions allow associations.

2. Terminal Partition Policy—A terminal partition policy may allow a given partition to be configured (independently of other partitions) to prevent establishment of corresponding child partitions. Once set TRUE, the policy may be established so that it will not change. This policy may prevent the creation of child partitions without preventing the changing of the partition attributes. Modification of the attributes of a partition may be made without a hierarchical explosion of partitions.

3. Configuration Lock Policy—A configuration lock policy may allow the configuration attributes, excluding the Terminal Partition policy, of a partition to be locked. Once set TRUE, the policy may be established so that it will not change. This mechanism may prevent changes to the resource partition, including changes to POSIX file permissions. It may allow the creation of child partitions so that a locked parent partition may be independently sub-partitioned by a separate (appropriately privileged) organization.

4. Permanence Policy—A permanence policy may prevent the destruction of a partition. Once set TRUE, the policy may be established so that it will not change. This policy may prevent partition removal independent of POSIX file permissions. POSIX permissions (or similar permissions for non-POSIX based systems) may be used to control the ability of a process to associate with a partition and to modify or examine its policies and attributes.

Figure 4:
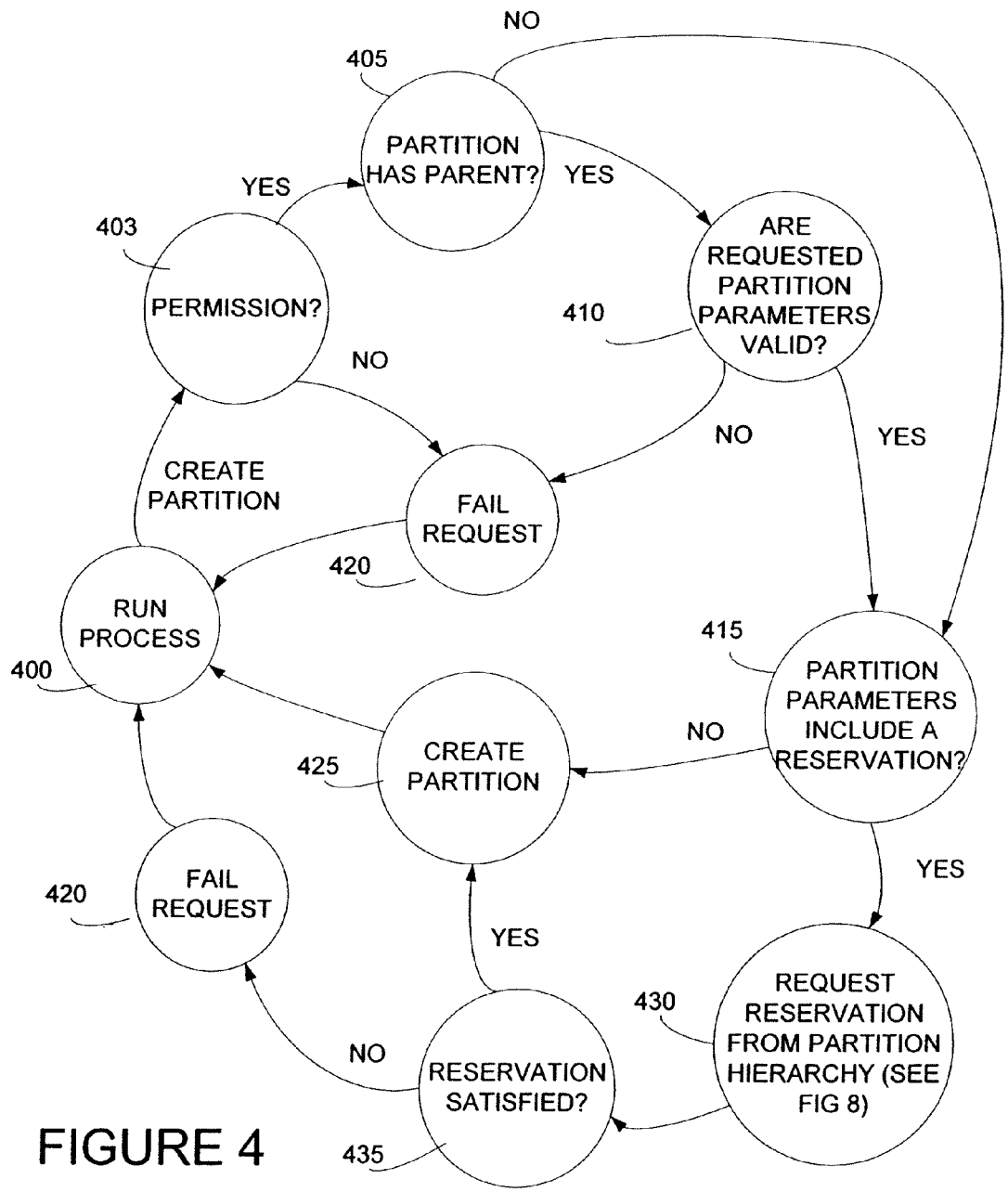
FIG. 4 is a state diagram showing a process for resource partitioning.

An implementation of the partitioning module 300 is presented in the diagrams of FIGS. 4 through 11. As shown in FIG. 4, when a running process 400 issues a command to establish a partition, the partitioning module 300 determines whether the process has the authorization or permission to create the partition at 403. If authorization is not received, then the request fails at 420, and control may return to the running process at 400. If the process has permission to create a partition, then the partitioning module 300 determines at 405 whether the requested resource partition will have a parent. If the resource partition does not have a parent, then the resource partition is a root partition, and control may pass to 415. If the partition will have a parent, then the process determines whether the requested partition parameters are valid at 410 by inspecting the partition hierarchy in which the new partition is being created. If the configuration parameters are not valid, then the partition request fails at 420. A notification may be issued on failure, or control may be to the requesting process either for another attempt or to abandon the attempt.

If the requested partition parameters are valid, then it is determined at 415 whether the partition parameters include a resource reservation. If not, then a resource partition is created at 425. If the partition parameters include a reservation, then a reservation is requested from the partition hierarchy, if one exists. The request propagates up the hierarchy until it is satisfied by one or more parent partitions and/or from the resource allocator at 430 for the resource class. If the new partition is a root partition, the request may be sent to the resource allocator 210 for the resource class. In either case, if the reservation is satisfied at 435, then the resource partition may be created at 425 and control may return to the requesting process. If the reservation is not satisfied, then the request fails at 420.

Figure 5:
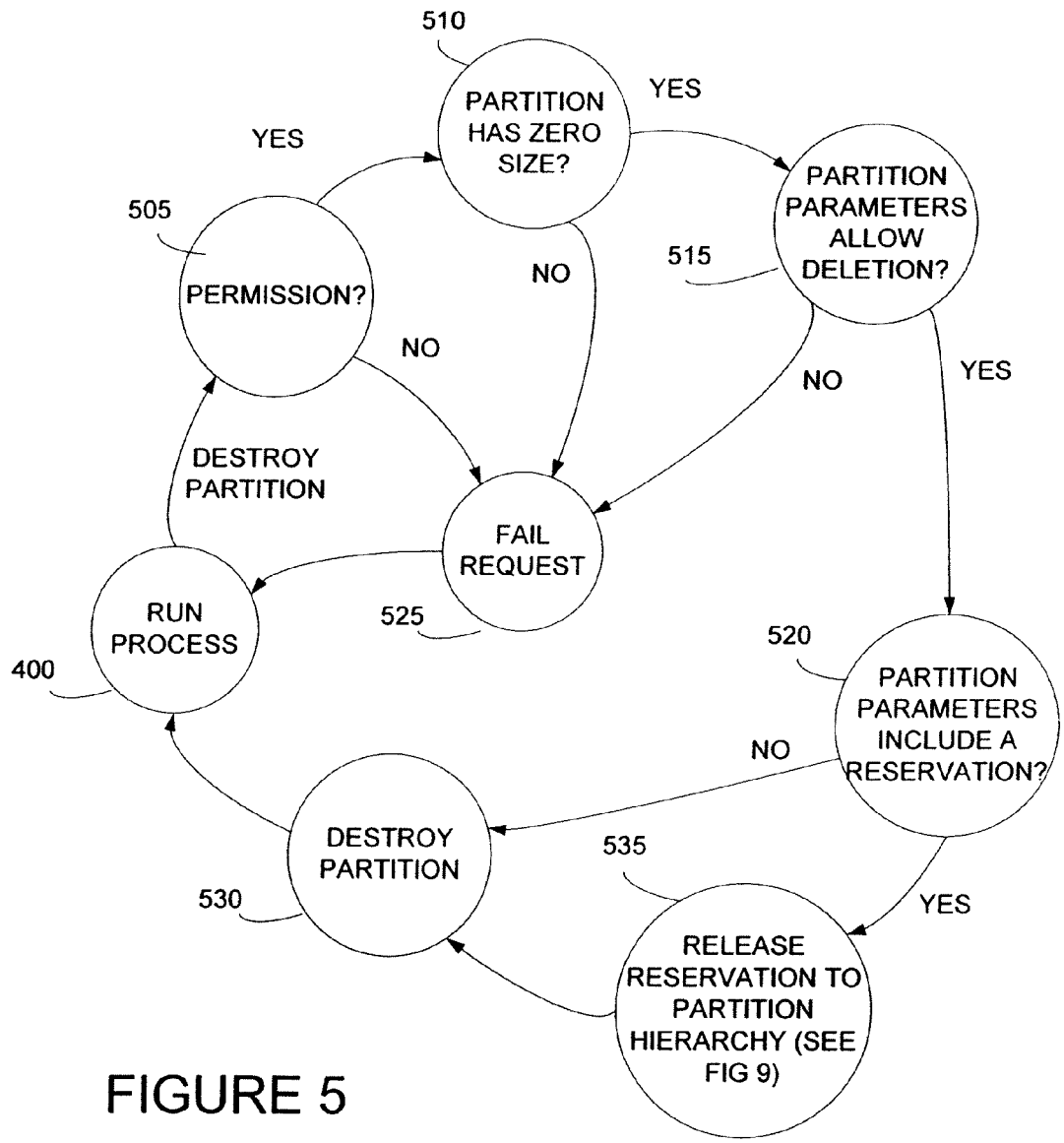
FIG. 5 is a state diagram showing a process to destroy a resource partition.

FIG. 5 is a diagram showing a process for destroying a partition. When the running process 400 issues one or more commands to destroy a partition, the partitioning module 300 determines whether the process has the authorization or permission to destroy the partition at 505. If not, then a fail request is issued at 525, and control may return to the running process 400. If the process has permission to destroy a partition, then it determines at 510 whether the identified resource partition has a zero size. If it does not, then the request fails at 525. If it does have a zero size, then control passes to 515, where the process determines whether the partition parameters allow deletion. A partition will not have a zero size if there are any processes or resource objects still associated with it. Processes should disassociate and the objects released before a partition may be destroyed.

Figure 9:
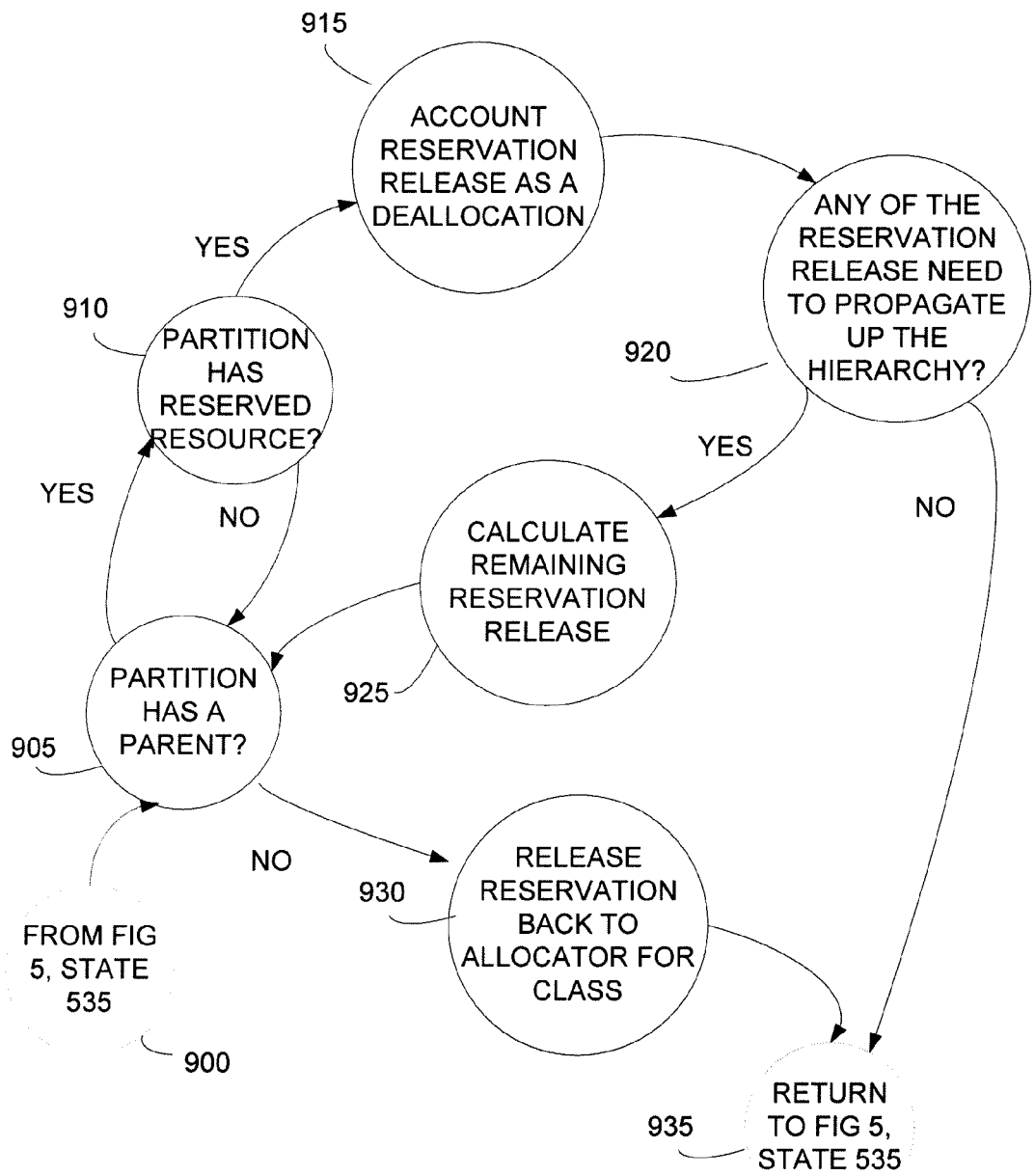
FIG. 9 is a state diagram of a process that releases a reservation to a resource partition hierarchy.

If the parameters do not allow deletion, then the request fails at 525. If the parameters allow deletion, then the process determines whether the partition parameters include a reservation at 520. If they do not, then the partition may be destroyed at 530, and control may return to the running process at 400. If the partition parameters include a reservation, then the reservation may be released to the partition hierarchy at 535 before the partition is destroyed at 530. FIG. 9 illustrates how the release of the reservation to the partition hierarchy at 535 may be effected.

Figure 6:
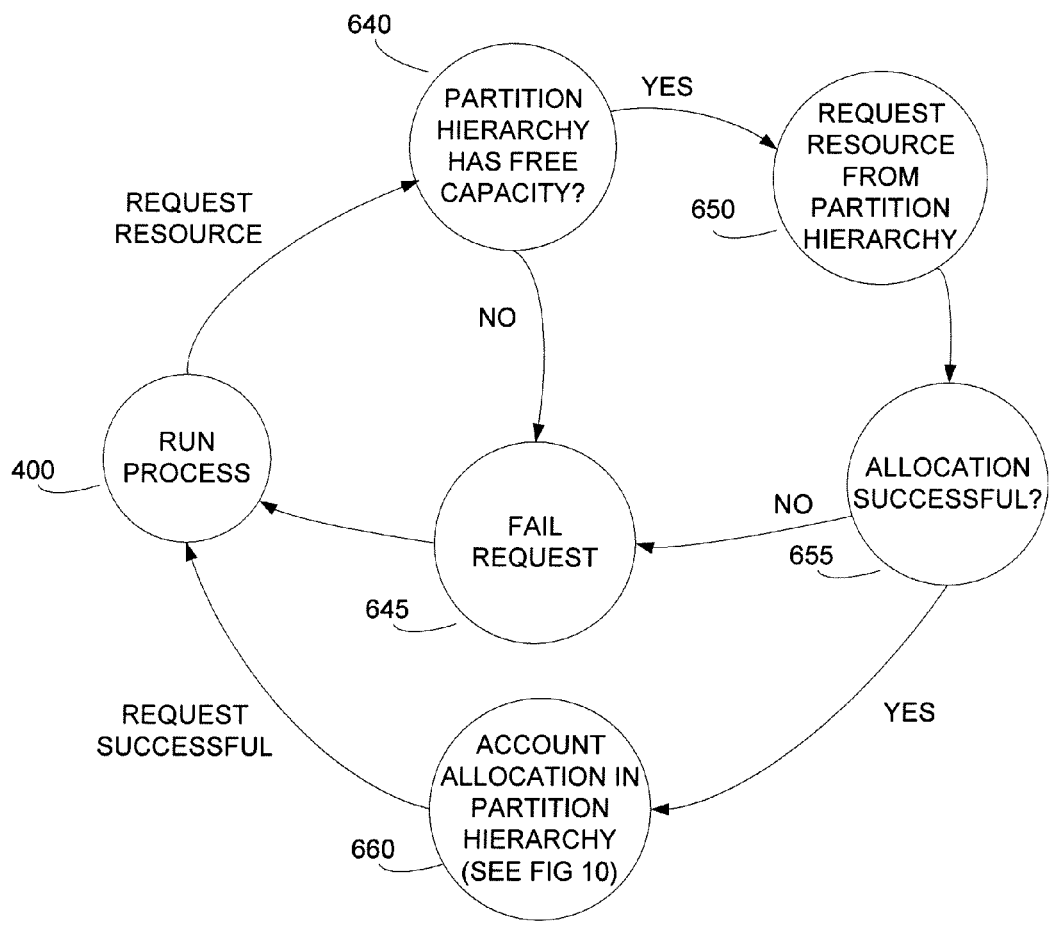
FIG. 6 is a state diagram showing a process to request a resource capacity governed by resource partitioning.

FIG. 6 is a diagram of a process for allocating a partition resource at runtime. When the software process 400 requests a resource, the partitioning module determines whether the partition hierarchy has free space at 640. If the resource is not available, then the request fails and process control may pass to 645. This failure may be reported to one or more processes pursuant to an attempt to reexecute the request. If the resource is available, then the resource is requested from the resource allocator at 650. The request to the resource allocator 210 may include a number of different parameters such as the amount of the allocation request that may be accounted to a previously established reservation, which portion should be accounted to an unreserved resource, and/or other resource parameters. If resource allocation is successful at 655, then the resource is accounted for at 660 and control may return to the requesting process to continue processing. If the allocation is not successful, then the request fails at 645, and a failure notification may be issued before returning control to the requesting process. In the event of a failure, there may not be in impact on the resource allocation, in which case there is no need to perform any accounting exercise.

Figure 7:
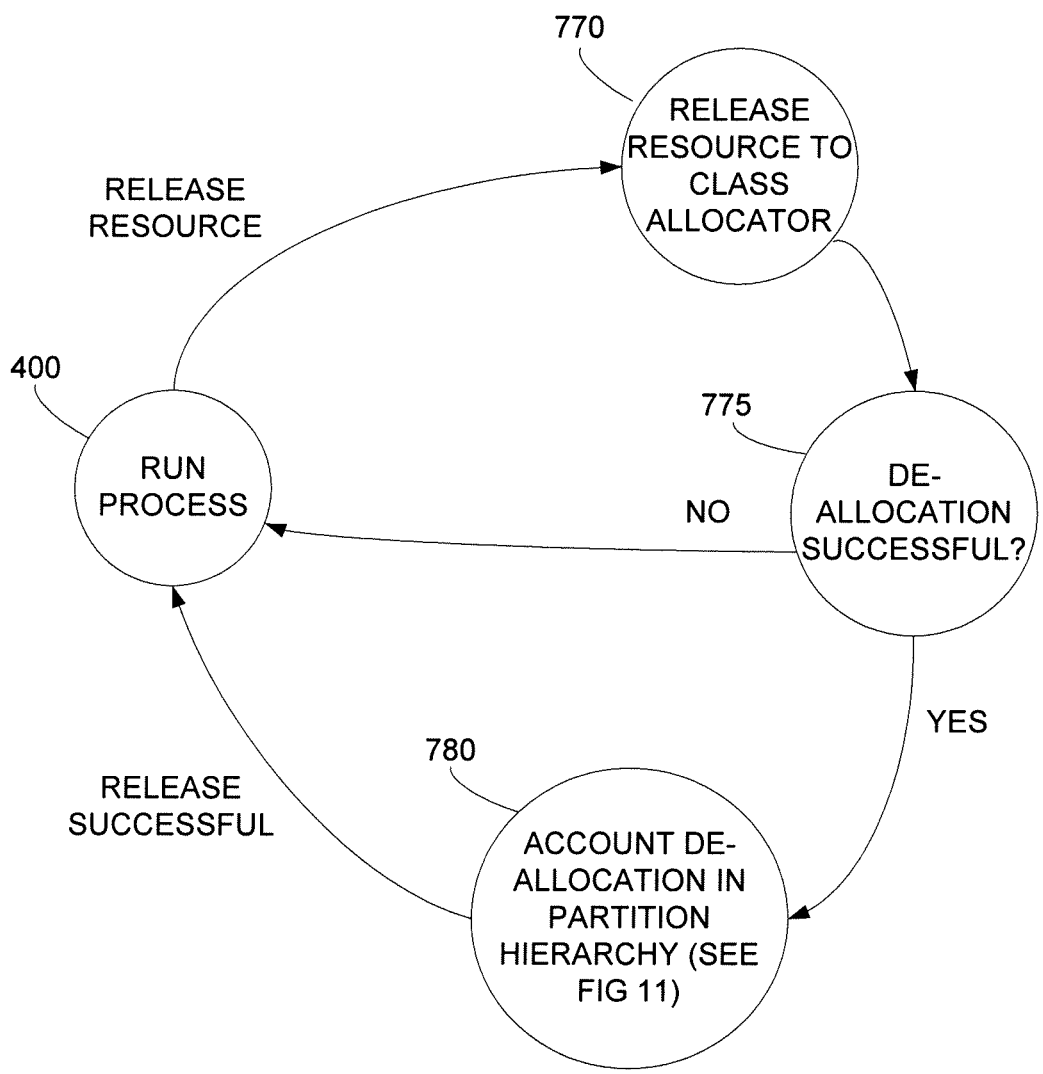
FIG. 7 is a state diagram of a process that releases a resource capacity governed by resource partitioning.

The elected or automatic release of a resource may follow the process shown in the diagram of FIG. 7. When a resource is no longer required, the process 400 may issue a resource release command at 770. If it is determined at 775 that the resource release was successful, then the resource release may be accounted for at 780 so that the released resource may become available for other processes. If the resource release instruction has insufficient permissions, or otherwise has invalid parameters, the release may be unsuccessful at 775 and the resource remains accounted for as in use.

Figure 8:
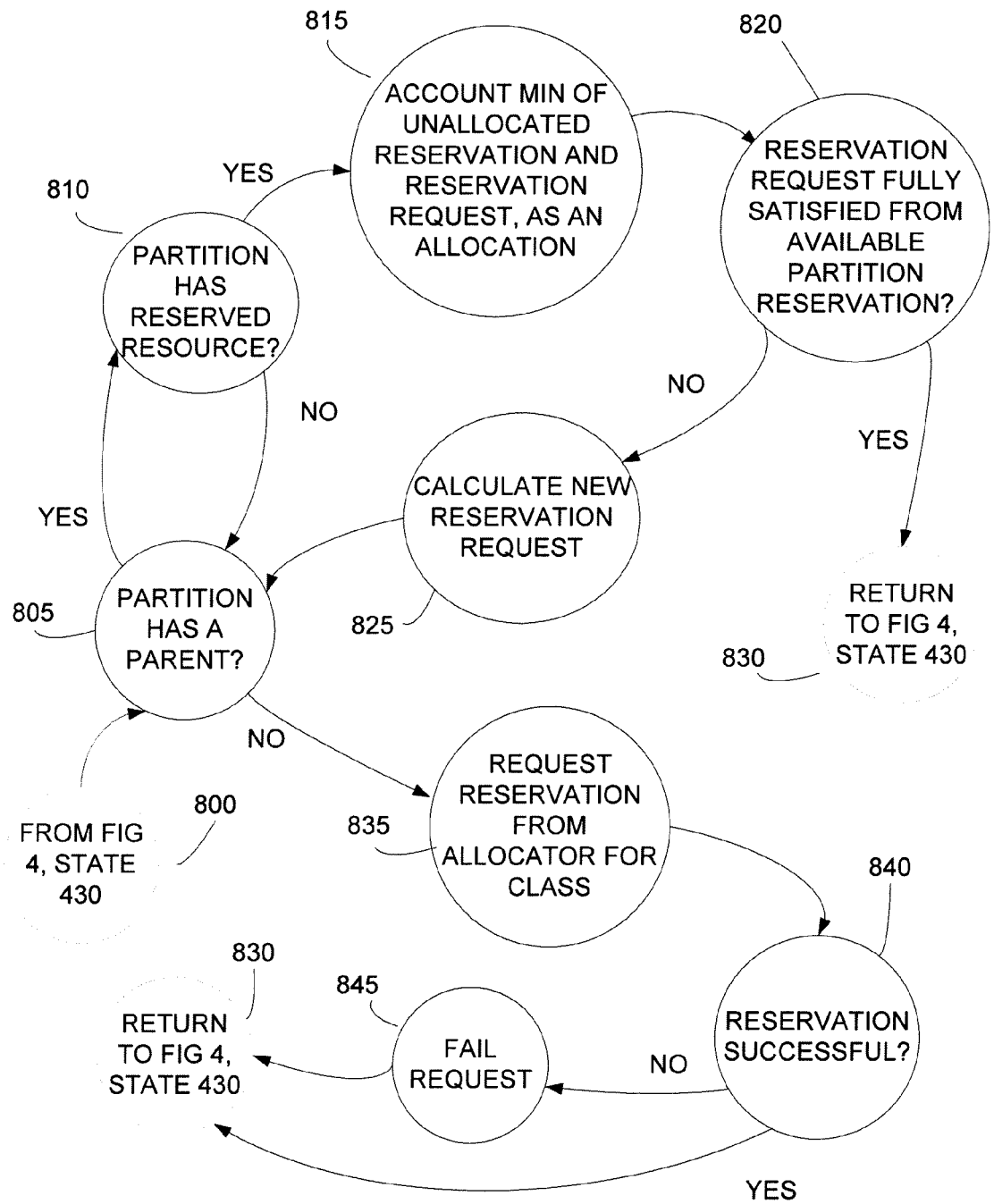
FIG. 8 is a state diagram of a process that requests a reservation from a resource partition hierarchy.

FIG. 8 is a diagram showing a process for requesting a reservation from a resource partition hierarchy. The process may include a query to establish whether the partition has a parent at 805. If it does, then a query may be made to determine whether the partition has a reserved resource 810. If the partition has a reserved resource, then the minimum of the (unallocated reservation and the reservation request) is accounted for as an allocation at 815. The process then determines at 820 whether the reservation request satisfies the available partition reservation. If so, then control may return to 430 of FIG. 4 is shown at 830. If not, then a new reservation request may be calculated at 825.

If it is determined at 805 that the partition does not have a parent, then a new reservation may be requested from the allocator for the class 835. If the reservation is successful at 840, then control may return to 430 of FIG. 4. If the reservation is determined to be unsuccessful at 840, then a fail request may be issued 845 and control returned to state 430 of FIG. 4

FIG. 9 is a diagram of a process to deallocate a reservation from a resource partition hierarchy. The process may include a query to establish whether the partition being deallocated has a parent at 905. If it does, then a query may be made to determine whether the partition has a reserved resource at 910. If the partition has a reserved resource, then the account reservation may be released as a deallocation at 915. The process may determine whether any portion of the reservation being released needs to propagate up the partition hierarchy at 920. This may occur when the original reservation (treated as an allocation in the hierarchy) is satisfied from reservations of partitions higher up in the partition hierarchy. If satisfied, then the remaining reservation to be released may be calculated at 925 and control may return to 905 so that this release can be completed. Otherwise, control may return to 535 of FIG. 5 as shown at 935 of FIG. 9.

At 905, the process determines that the partition does not have a parent. As a result, the reservation may be released back to the allocator for the class at 930. Control may return to state 535 of FIG. 5 as shown at 935 of FIG. 9.

Figure 10:
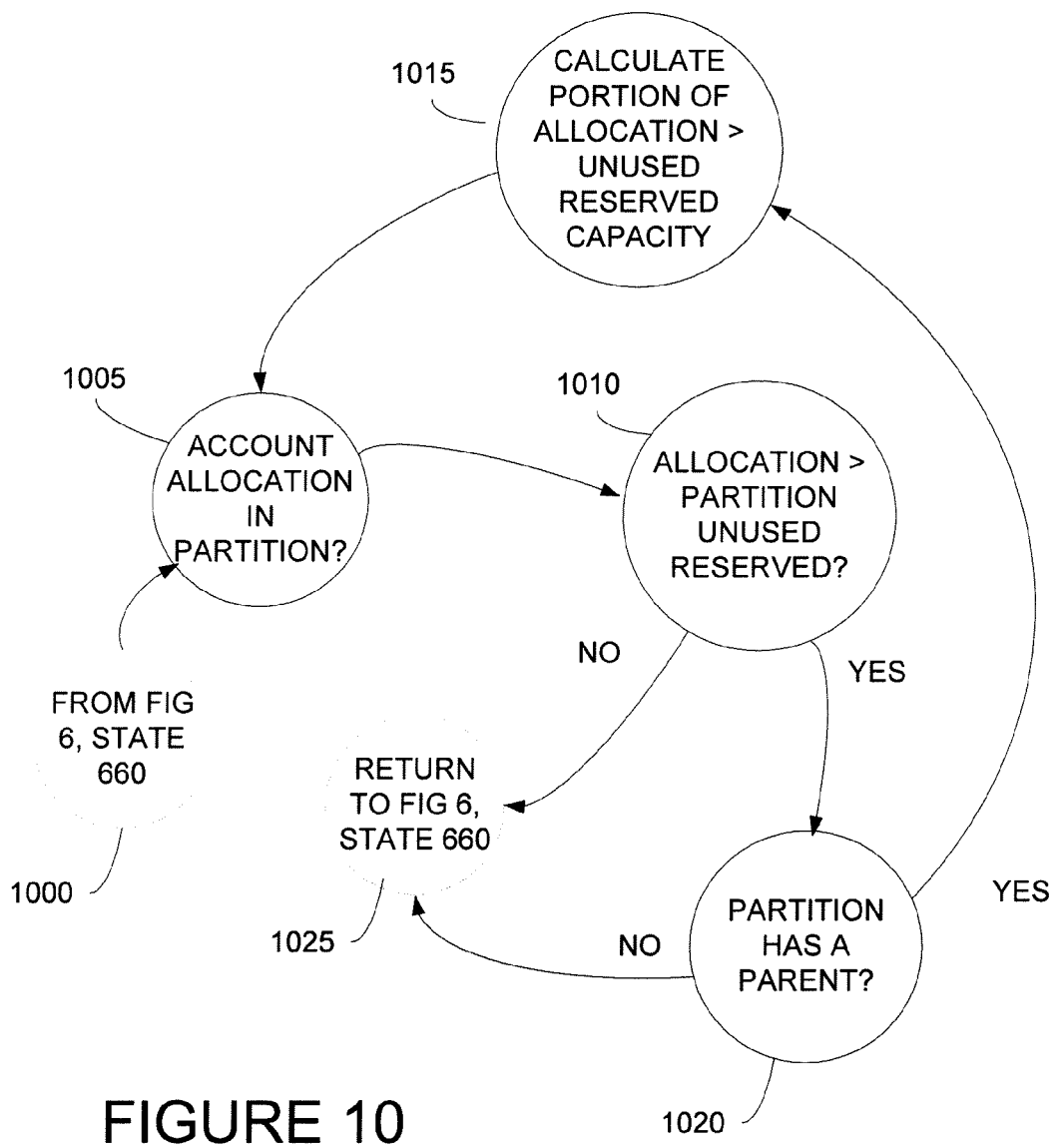
FIG. 10 is a state diagram of a process for accounting an allocation in a resource partition hierarchy.

FIG. 10 is a diagram of a process for accounting for allocation in a partition hierarchy. The process may include determining the amount of the resource to allocate in the partition at 1005. The process may determine whether the allocation is greater than the unused reserved space for the partition at state 1010. If not greater than the unused reserved space, then control may be returned to 660 of FIG. 6 as shown at 1025 of FIG. 10.

If the allocation is greater than the unused reserved space for the partition, then the process may determine whether the partition has a parent at 1020. If the partition does not have a parent, then control may return to 660 of FIG. 6 as shown at 1025 of FIG. 10. If the partition does have a parent then the portion of the allocation that is greater than the unused reservation may be calculated at 1015, and control may return to 1005 so that the allocation can be accounted for. The process may continue looping up through the hierarchy at 1020 to account for allocation on all levels.

Figure 11:
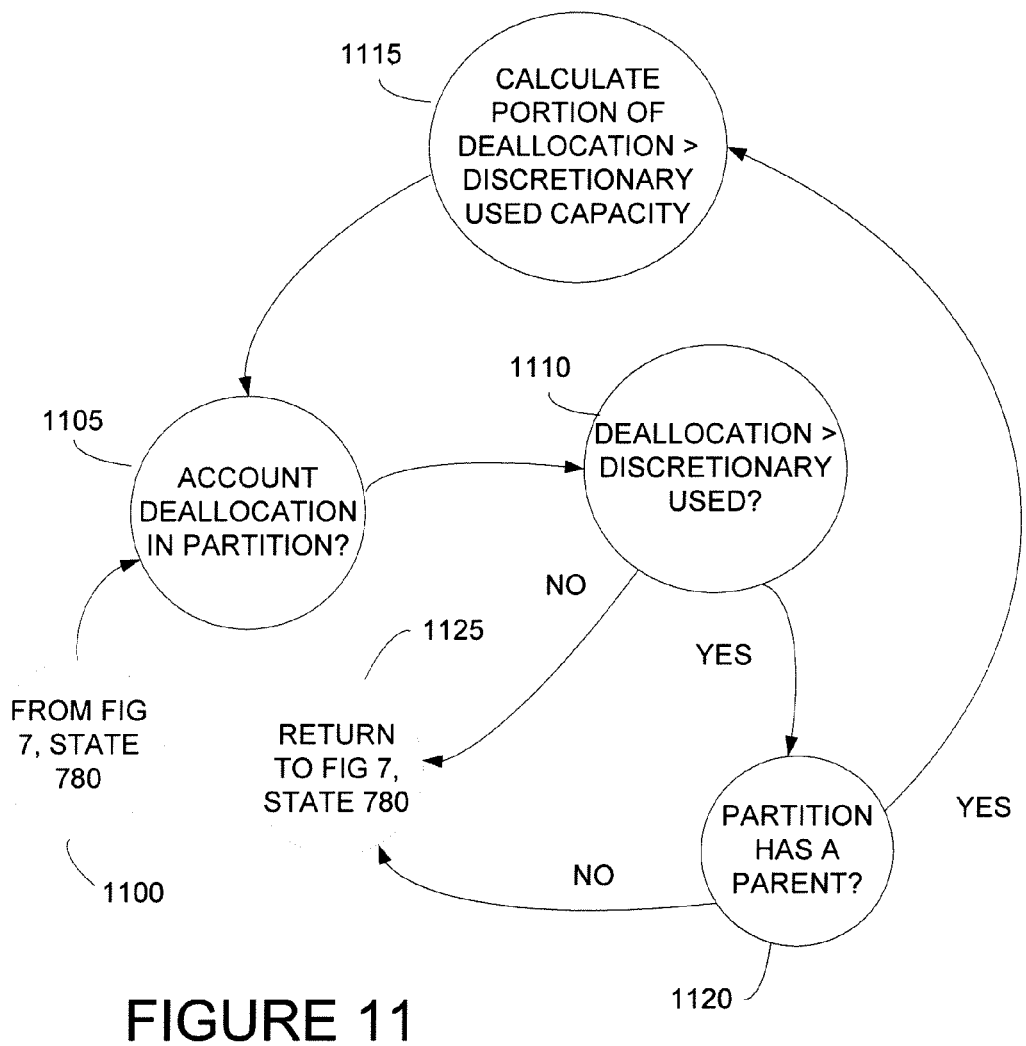
FIG. 11 is a state diagram of a process for accounting a deallocation in a resource partition hierarchy.

FIG. 11 is a diagram of a process for resource deallocation. The process may include determining the amount of the resource to deallocate in the partition at 1105. The process determines at 1110 whether the deallocation is greater than the discretionary amount of the resource used for the partition. If not, then control may return to 780 of FIG. 7 as shown at 1125 of FIG. 11.

If the deallocation is greater than the discretionary unused resource for the partition then it may be determined whether the partition has a parent at 1120. If the partition does not have a parent, then control may return to 780 of FIG. 7 as shown at 1125 of FIG. 11. If the partition has a parent, then the process may calculate the portion of the deallocation that is greater than the discretionary unused reservation at 1015. Control may return to 1105 so that the deallocation may be accounted for. The process may loop up through the hierarchy at 1120 to account for the allocation on all levels of the hierarchy.

This system and method may be applied to a broad range of processing system resources. Some of the considerations with respect to specific applications are as follows:

i. interrupt channels;
In some instances, it may be of interest to manage the number of interrupt channels assigned to processes using adaptive resource management;

ii. direct memory access (DMA);
A DMA controller may have several independently programmable DMA channels or engines. The channels may be partitioned as allocatable resources. Since requests for DMA may be driven by a queue of requests, a virtual channel allocator may be used to partition the virtual channels. The channels may be used to enable a DMA request to be queued and partitions of these channels could be used to control admission;

iii. mutexes and semaphores;
These types of objects may be created from memory. Memory partitioning may be used to indirectly control the allocations of these types of objects. It is possible to establish partitions of purposeful memory objects (like mutexes). Other implementations may use per process limits (a private, restricted partition type); and iv. interface cards and hardware subsystems;
Similar to DMA channels, the entire card need not necessarily be allocated. Rather, the interface card may provide a collection of sub-devices that can perform some service. An allocator may supervise these sub-devices as a partitionable entity similar to the DMA channels described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A processing system comprising:
a processor for accessing a resource;
a partitioning component in communication with the processor, the partitioning component configured to associate a resource partition with the resource, the resource partition having a set of partitioning rules including a minimum resource allocation and a maximum resource allocation; and
where the partitioning component is configured to intercept a first resource request for the resource sent from a requesting software application and/or process to a resource allocator configured to reserve a resource, and control access to the resource requested by the requesting software application and/or process in accordance with the set of partitioning rules; and
where the partitioning component provides a modified or new resource request to the resource allocator in place of the first resource request wherein the modified or new resource request is based on the set of partitioning rules including a minimum resource allocation and a maximum resource allocation.

2. The processing system of claim 1, where the partitioning component is configured to validate or deny a resource request from the software application and/or process to enforce the set of partitioning rules associated with the resource.

3. The processing system of claim 1, where the partitioning component is configured to set limits for the minimum resource allocation and the maximum resource allocation to define attributes of the resource partition.

4. The processing system of claim 1, where the resource partition is dynamic and the partitioning component is configured to adjust limits of the minimum resource allocation and the maximum resource allocation at run time.

5. The processing system of claim 1, where a first object class and a second object class are associated with the requesting software application and/or process; and
where based on the set of partitioning rules associated with the resource, the partitioning component grants the first object class access to the resource and denies the second object class access to the resource.

6. The processing system of claim 1, where the resource partition comprises a parent resource partition of one or more child resource partitions, where attributes of the parent resource partition constrain attributes of the one or more child resource partitions; and
where allocations to the requesting software application and/or process from the child resource partition account against the parent resource partition.

7. The processing system of claim 1,
where the partitioning component generates the modified or new resource request by manipulating the first resource request based on the set of partitioning rules.

8. The processing system of claim 1, where the partitioning component is configured to group a plurality of resource partitions together as a single pseudo-partition.

9. The processing system of claim 1, where the set of partitioning rules comprises a terminal partition policy that when enabled prevents establishment of child partitions under the resource partition.

10. The processing system of claim 1, where the set of partitioning rules comprises a configuration lock policy that when enabled prevents changes to attributes of the resource partition.

11. The processing system of claim 1, where the set of partitioning rules comprises a permanence policy that when enabled prevents destruction of the resource partition.

12. The processing system of claim 1, where the minimum resource allocation indicates a reserved portion of the resource associated with the resource partition; and
where a difference between the maximum resource allocation and the minimum resource allocation indicates a discretionary portion of the resource associated with the resource partition.

13. The processing system of claim 1, where the resource partition comprises an open use configuration with the minimum resource allocation set to zero and the maximum resource allocation set to unlimited.

14. The processing system of claim 1, where the resource partition comprises a guarantee use configuration with the minimum resource allocation set to a nonzero value and the maximum resource allocation set to unlimited.

15. The processing system of claim 1, where the resource partition comprises a restricted use configuration with the minimum resource allocation set to zero and the maximum resource allocation set to a nonzero value.

16. The processing system of claim 1, where the resource partition comprises a sandbox use configuration with the minimum resource allocation set to a first nonzero value and the maximum resource allocation set to a second nonzero value.

17. The processing system of claim 1, where the partitioning component is configured to establish one or more resource partitions to control access to internal memory, external memory, external communication bandwidth, interrupt channels, direct memory access resources, mutexes, semaphores, interface cards, or hardware systems.

18. The processing system of claim 1, where the partitioning component is configured to control allocation of a plurality of interrupt channels of the resource in accordance with the set of partitioning rules associated with the plurality of interrupt channels.

19. The processing system of claim 1, where the set of partitioning rules associated with direct memory access (DMA) capable memory of the resource comprises a limited access rule that indicates which requesting software applications and/or processes may access the DMA capable memory; and
where the partitioning component is configured to control access to DMA capable memory in accordance with the limited access rule associated with the DMA capable memory.

20. The processing system of claim 1, where the partitioning component is configured to control access to a mutex or semaphore of the resource created in memory in accordance with the set of partitioning rules associated with the mutex or semaphore.

21. The processing system of claim 1, where the partitioning component is configured to control access to a plurality of sub-devices of an interface card of the resource in accordance with the set of partitioning rules associated with the interface card.

22. A processing system comprising:
a processor for accessing a resource;
resource partitioning software executable by the processor to establish a resource partition corresponding to the resource, the resource partition having corresponding partitioning rules including a minimum resource allocation and a maximum resource allocation; and
where the resource partitioning software intercepts a first resource request for the resource sent from a requesting software application to a resource allocator configured to reserve a resource, and controls access to the resource requested by the requesting software application and/or process in accordance with the corresponding partitioning rules; and
where the resource partitioning software provides a modified or new resource request to the resource allocator in place of the first resource request wherein the modified or new resource request is based on the corresponding partitioning rules including a minimum resource allocation and a maximum resource allocation.

23. The processing system of claim 22, where the resource partitioning software assigns an amount of the resource for use by the requesting software application and/or process in accordance with the corresponding partitioning rules.

24. A method, comprising the steps of:
associating a resource partition with a resource, the resource partition having a set of partitioning rules including a minimum resource allocation and a maximum resource allocation;
intercepting a first resource request sent from a software application and/or process to a resource allocator, the first resource request including a request for access to the resource;
controlling access to the resource in accordance with the set of partitioning rules associated with the resource; and
providing a modified or new resource request to the resource allocator in place of the first resource request wherein the modified or new resource request is based on the set of partitioning rules including a minimum resource allocation and a maximum resource allocation.

25. The method of claim 24, where the step of controlling comprises the steps of:
comparing the resource request with the set of partitioning rules associated with the resource; and
determining whether the software application and/or process can satisfy the set of partitioning rules to gain access to the resource.

26. The method of claim 24, where the step of providing comprises the steps of:
manipulating the first resource request based on the set of partitioning rules; and
sending the new or modified resource request to the resource allocator, where the resource allocator coordinates access to the resource.

27. A processing system comprising:
a processor including means for associating a resource partition with a resource, the resource partition having a set of partitioning rules including a minimum resource allocation and a maximum resource allocation;
means for intercepting a first resource request sent from a software application to a resource allocator, the first resource request including a request for access to the resource;
means for controlling access to the resource in accordance with the set of partitioning rules associated with the resource; and
means for providing a modified or new resource request to the resource allocator in place of the first resource request wherein the modified or new resource request is based on the set of partitioning rules including a minimum resource allocation and a maximum resource allocation.

* * * * *